(12) United States Patent
Valcan et al.

(10) Patent No.: US 11,245,261 B2
(45) Date of Patent: Feb. 8, 2022

(54) METHOD FOR CONTROLLING A WIND POWER PLANT

(71) Applicant: VESTAS WIND SYSTEMS A/S, Aarhus N (DK)

(72) Inventors: Dumitru-Mihai Valcan, Langå (DK); Jorge Martinez Garcia, San Juan de Aznalfarache (ES); Kouroush Nayebi, Ikast (DK); Jesper Sandberg Thomsen, Hadsten (DK); Martin Ansbjerg Kjær, Harlev J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 808 days.

(21) Appl. No.: 16/065,591

(22) PCT Filed: Dec. 12, 2016

(86) PCT No.: PCT/DK2016/050426
§ 371 (c)(1),
(2) Date: Jun. 22, 2018

(87) PCT Pub. No.: WO2017/114527
PCT Pub. Date: Jul. 6, 2017

(65) Prior Publication Data
US 2021/0167603 A1    Jun. 3, 2021

(30) Foreign Application Priority Data
Dec. 29, 2015   (DK) .......................... PA 2015 70887

(51) Int. Cl.
*H02J 3/00*        (2006.01)
*H02J 3/38*        (2006.01)
*F03D 7/02*        (2006.01)
*F03D 7/04*        (2006.01)
*H02J 3/46*        (2006.01)

(52) U.S. Cl.
CPC ............ *H02J 3/381* (2013.01); *F03D 7/0284* (2013.01); *F03D 7/048* (2013.01); *H02J 3/46* (2013.01);
(Continued)

(58) Field of Classification Search
CPC .......... H02J 3/381; H02J 3/46; H02J 2300/28; F03D 7/048; F03D 7/0284; F05B 2220/706; F05B 2270/337
See application file for complete search history.

(56) References Cited

U.S. PATENT DOCUMENTS

| 2009/0218817 A1* | 9/2009 | Cardinal ................. F03D 7/048 290/44 |
| 2010/0025994 A1 | 2/2010 | Cardinal et al. |

(Continued)

FOREIGN PATENT DOCUMENTS

| CN | 101521388 A | 9/2009 |
| CN | 101784791 A | 7/2010 |

(Continued)

OTHER PUBLICATIONS

PCT Notification of Transmittal of the International Search Report and the Written Opinion of the International Searching Authority, or the Declaration for Application No. PCT/DK2016/050426 dated Mar. 10, 2017.

(Continued)

*Primary Examiner* — Julio C. Gonzalez
(74) *Attorney, Agent, or Firm* — Patterson + Sheridan, LLP (57) ABSTRACT

A method for controlling a wind power plant comprising a plurality of wind turbine generators, wherein the method comprises: deriving an estimated value for electrical losses in the wind power plant, deriving a measured value for electrical losses in the wind power plant, based on a differ- (Continued)

ence between an aggregated power production from the plurality of wind turbine generators and a power measurement at a point of common coupling; applying the estimated value for electrical losses and the measured value for electrical losses in an active power control loop, comprising a regulator; and controlling by means of the active power control loop an active power production of the wind power plant at the point of common coupling.

9 Claims, 8 Drawing Sheets

(52) U.S. Cl.
CPC ... *F05B 2220/706* (2013.01); *F05B 2270/337* (2013.01); *H02J 2300/28* (2020.01)

(56) References Cited

U.S. PATENT DOCUMENTS

| | | | |
|---|---|---|---|
| 2011/0313591 | A1 | 12/2011 | Andresen et al. |
| 2013/0166082 | A1* | 6/2013 | Ambekar ............... F03D 7/028 700/287 |
| 2015/0219074 | A1 | 8/2015 | Babazadeh et al. |
| 2015/0263521 | A1 | 9/2015 | Garcia |
| 2015/0267683 | A1 | 9/2015 | Ubben et al. |
| 2016/0049792 | A1 | 2/2016 | Burra et al. |
| 2018/0152020 | A1* | 5/2018 | Kuroda ..................... H02J 3/00 |

FOREIGN PATENT DOCUMENTS

| | | |
|---|---|---|
| CN | 104578402 A | 4/2015 |
| EP | 2921699 A1 | 9/2015 |
| WO | 2015078474 A1 | 6/2015 |
| WO | 2017114527 A1 | 7/2017 |

OTHER PUBLICATIONS

PCT Written Opinion for Application No. PCT/DK2016/050426 dated Dec. 12, 2016.
India Examination Report for Application No. 201817021120 dated Jun. 7, 2020.
Chinese Office Action dated Oct. 29, 2020 for Application No. 201680077194.2.

* cited by examiner

METHOD FOR CONTROLLING A WIND POWER PLANT

TECHNICAL FIELD

Aspects of the invention relate to the control of a wind power plant, particularly in connection with power boosting or fast increase of active power production.

BACKGROUND OF THE INVENTION

High penetration of wind turbines in the electrical grids has let requirements for the wind turbines, on how they should contribute to the stability of the electrical grids. Such requirements are included in so-called grid codes.

One of the requirements which may be included in certain grid codes is inertia response. Inertia response is a functionality where the power is boosted from the normal production for a short period of time, i.e. power delivered to the electrical grid is increased. The boost of power function may be available at all wind speeds. For very low wind speeds, the power boost may be rather reduced.

Depending on the grid code, the details of the boost phase may vary. In some locations, a boost power should be provided upon request. In an example, it may be specified that whenever the production from the wind power plant is above 25% of rated power, the wind power plant must be able to deliver a power boost of 5-10% of rated power for a given time period, e.g. up to 10 seconds. The grid code may also specify requirements for the recovery period. As an example, after the boost it may be specified that the wind turbine must have returned to normal operation after 2 minutes, and that during the recovery phase the power produced by the wind turbine should remain within 80% of available power.

EP2384540 discloses a power generation system. The power generation system includes a power generation unit operable to supply electrical power to an utility system; a synchronous machine coupled to the utility system; a grid measurement device for measuring the current and power exchanged between the synchronous machine and the utility system; a controller for adjusting the output power of the power generation unit as a function of the power and current measured by the grid measurement device; and a communication link between the grid measurement device, the controller and/or the power generation unit. The power generation unit is configured to provide current and power to the utility system as a function of the power and current measured by the grid measurement device.

SUMMARY OF THE INVENTION

The prior art solution suffers from large delay in communication, which leads to slow response times and inaccurate active power control.

It is thus an objective of the present invention to provide a solution to improve the response time of a power loop of a wind power plant.

Embodiments of the present invention provide a solution to circumvent at least some of the problems with the prior art.

This Summary is provided to introduce a selection of concepts in a simplified form that are further described below in the Detailed Description.

This Summary is not intended to identify key features or essential features of the claimed subject matter, nor is it intended to be used as an aid in determining the scope of the claimed subject matter.

A first aspect of the invention relates to a method for controlling a wind power plant comprising a plurality of wind turbine generators. The method comprises:
  deriving an estimated value for electrical losses in the wind power plant;
  deriving a measured value for electrical losses in the wind power plant, based on a difference between an aggregated power production (Pprod) from the plurality of wind turbine generators and a power measurement (Pmeas) at a point of common coupling;
  applying the estimated value for electrical losses and the measured value for electrical losses in an active power control loop, comprising a regulator; and
  controlling by means of the active power control loop an active power production of the wind power plant at the point of common coupling.

A second aspect of the invention relates to an active power controller for controlling a wind power plant. The wind power plant comprises a plurality of wind turbine generators. The controller comprises: a module for deriving an estimated value for electrical losses in the wind power plant; a module for deriving a measured value for electrical losses in the wind power plant, based on a difference between an aggregated power production (Pprod) from the plurality of wind turbine generators and a power measurement (Pmeas) at a point of common coupling; and a regulator arranged to apply the estimated value for electrical losses and the measured value for electrical losses in an active power control loop, the active power control loop being arranged to control an active power production of the wind power plant at the point of common coupling.

A third aspect of the present invention relates to a computer program product loadable into an internal memory of a processing device, the computer program product comprising software code portions for performing in the processing device the steps of the method according to the first aspect or any of the embodiments of the method.

A fourth aspect of the invention relates to a wind power plant comprising a plurality of wind turbine generators and an active power controller according to the second aspect above.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF THE EMBODIMENTS

Embodiments of the present invention will now be explained in further details.

Figure 1:
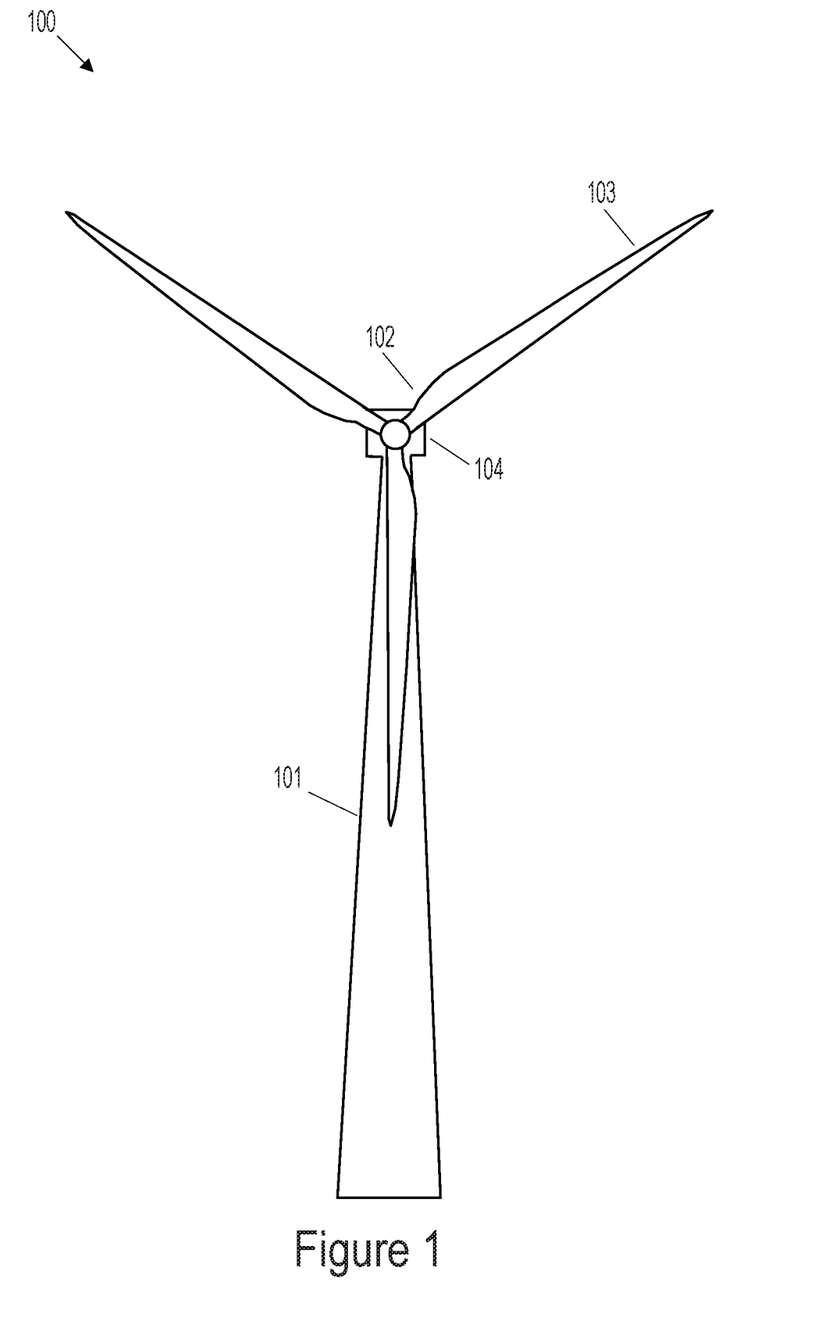
FIG. 1 schematically shows a wind turbine.

FIG. 1 shows a wind turbine generator (WTG) 100 comprising a tower 101 and a rotor 102. The rotor comprises three rotor blades 103. However, the number of blades may vary, and there may be two, four or even more blades. The rotor is connected to a nacelle 104, which is mounted on top of the tower 101, and is arranged to drive an electrical generator situated inside the nacelle. The rotor 102 is rotatable by action of the wind. The wind-induced rotational energy of the rotor blades 103 is transferred via a shaft to the electrical generator. Thus, the WTG 100 is capable of converting kinetic energy of the wind into mechanical energy by means of the rotor blades and, subsequently, into electric power by means of the electrical generator. The electrical layout of the WTG may in addition to the electrical generator include a power converter. The power converter is connected in series between the electrical generator and the electrical grid for converting the variable frequency generator AC power into a grid frequency AC power to be injected into the utility/electrical grid. The electrical generator is via the power converter controllable to produce a power corresponding to a power request.

The blades 103 can be pitched in order to alter the aerodynamic properties of the blades, e.g. in order to maximize uptake of the wind energy. The blades are pitched by a pitch system, which includes actuators for pitching the blades dependent on a pitch request.

A WTG is, in normal operation, set to capture as much power from the wind, at any given wind speed. This works as long as the power production is below the rated power limit for the wind turbine, i.e. partial load operation. When the wind speed increases above rated wind speed, often designed at 10-12 m/s, the WTG has to pitch the blades 103, so the energy captured is stable at rated power, even if the wind is well above rated wind speed.

Figure 2:
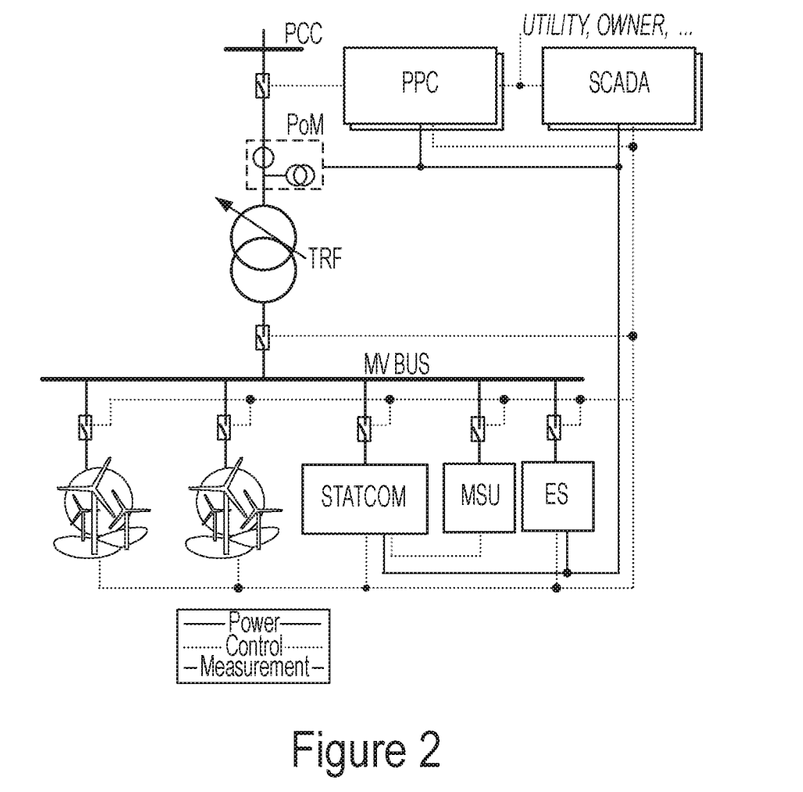
FIG. 2 schematically shows a generic Wind Power Plant Architecture

A wind power plant (WPP) comprises a plurality WTGs controlled by a power plant controller (PPC) and interconnection infrastructure. FIG. 2 shows an example of a generic WPP architecture with a plurality of WTGs, a collection grid with a MV collection bus, a transformer (TRF). At the high voltage side of the transformer there is a point of measurement (PoM), close to the Point of Common Coupling (PCC). Between the PCC and the TRF a power plant circuit breaker or a switch gear is installed and is operated by the PPC, in order for system operators to disconnect the WPP from the grid.

From the WTGs to the PCC there may be several electrical infrastructure components, e.g. power cables etc. All the components are needed, but they contribute to losses from the WTGs to the PCC. Losses which have to be taken into account when controlling the WPP.

The measurements obtained at the PoM are communicated to the PPC and optionally also to a SCADA system. The SCADA is optional and is not necessarily interacting with embodiments of the present invention. Based on the measurements, the PPC controls the WTGs accordingly. Further optional equipment is also shown, such as a STAT-COM, MSU (Mechanically Switched Unit, wherein the unit can be either capacitors or inductors), ES (Energy Storage) all used for improving power quality and stability.

The Power Plant Controller (PPC) in a control system within a Wind Power Plant (WPP) has among others the responsibility to control Active Power (P) and Reactive Power (Q) at the Point of Interconnection (POI) with the Utility Grid (UG). The P and Q quantities are the means by which other system parameters can be influenced, such as the grid frequency (f) and voltage (V). The controller structure has as inner loops the P and Q control, and has as outer loops the f and V control.

Besides the core functionalities described above, the PPC is also responsible for other WPP functionalities, which are required either by the Transmission System Operator (TSO) or by the WPP owner.

The Active Power control loop is responsible for controlling P at the point of interconnection. This inner loop can be used to influence the grid frequency, by adding appropriate external control loops (primary frequency regulation, fast frequency response and inertia emulation response). Power Oscillation Damping can be achieved as well by adding an appropriate external control loop.

Active Power Loop (APL) may comprise all controllers affecting the active power injection at the PCC (e.g. frequency controller, inertia emulation controller, output ramp rate limiter, active power dispatcher, etc.). In this document only the core (inner) loop of the APL is considered (i.e. what is called Active Power Controller).

Active Power Controller (APC) is a control structure within the PPC which is aimed to regulate the active power injection at the PCC according to specified requirements, while ensuring stable operation of the WPP with regard to active power.

APC receives a set-point which represents the active power injection that is requested at the PCC. This request can be issued by the system operator (e.g. fixed amount of active power) or by other "upstream" control loops (e.g. variable amount of active power issued by the frequency controller).

APC outputs a power reference for the WPP which goes through the Ramp Rate Limiter and finally through the Active Power Dispatcher in order to be shared among the WTGs.

In general, an active power controller consists of two main signal paths, namely:

The "forward" path, which builds up the reference to be sent to the WTGs by summing up or subtracting other signals (e.g. power set-point, power measurement, feed-forward terms).

The "feedback" path, which usually contains measurements from the electrical circuit (e.g. active power P at POI, aggregated sum of active power P production from WTGs).

Due to sampling and communication delays in the forward and feedback path, the system can be unstable. In the same time, the controller response quality can be poor.

In order to solve this problem, it is proposed to include means to improve the controller response quality and to provide closed-loop stability to the system.

Figure 3:
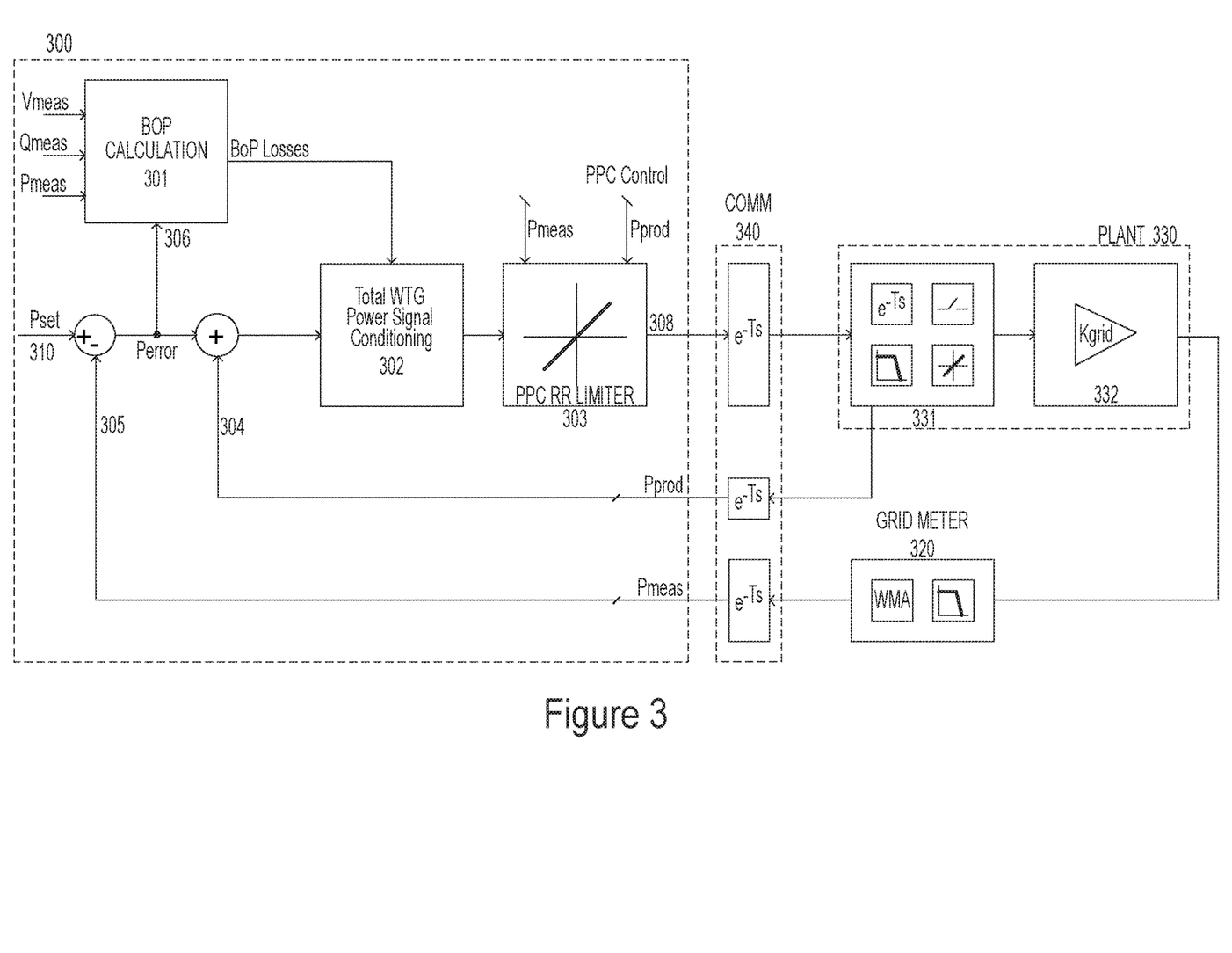
FIG. 3 shows a schematic diagram of an active power loop (dispatcher not represented)

FIG. 3 shows the structure of a P loop for an embodiment. As can be noticed, the loop comprises a proportional controller 332 with a unity gain, with a feed-forward of the WTGs power production 304. The power reference 308 to be sent to the WTGs is calculated as follows:

$$\text{Pref\_WTG} = \text{P\_set} + \text{P\_prod\_WTG} - \text{P\_meas}$$

$$= \text{P\_set} + \text{P\_losses}$$

The above equation is valid for the case when disturbances in the system are neglected. If disturbances are considered, the following equation is valid:

$$\text{Pref\_WTG} = \text{P\_set} + \text{P\_prod\_WTG} - \text{P\_meas} + \text{P\_disturbance}$$

$$= \text{P\_set} + \text{P\_losses} + \text{P\_disturbance}$$

As can be seen in the last equation above, the reference power sent to the WTGs is in fact the power set-point plus the measured losses in the system. Therefore, in order to issue a correct set-point, the power losses in the system must be correctly measured. This implies small and similar communication delays in the measured power at the POI and the measured WTGs power production.

The reference power signal 308 sent to the WTGs is conditioned in the "Total Power Signal Conditioning" block 302. This block performs two main tasks:

If the power error 306 is within a specified small value (i.e. in other words, if the measured power is close to the power set-point), the algorithm detects if there are any oscillations in the reference power sent to the WTGs and, in case there are oscillations it reduces the oscillations by altering (e.g. reducing) the WTGs' power reference change.

If the power error 306 is outside a specified small value, or if the algorithm does not detect oscillations, the WTGs' power reference is not altered.

In the second task the algorithm verifies if the reference power 308 sent to the WTGs has the correct trend (i.e. increase or decrease—depending on the power error sign. If the trend is not correct, the WTGs' power reference is kept to the value on the previous time step.

The wrong trend in the WTGs' reference power can be due to the communication delay in the WTGs' power production, which is larger than the communication delay in the measured power at the POI. The wrong trend can also be if the delay in measured power at POI is larger than delay in the reported WTGs' production. Basically as long as there is a communication delay between the two feedbacks, there can be a wrong trend in the WTGs' reference.

The "Balance of Plant Estimator" functionality will be further described, it can be understood as a Power loss estimation.

The Balance of Plant Estimator 301 uses:
a) measured information from the electrical system (such as voltage and reactive power—as a minimum) and
b) the power set-point of the active power loop (Pset) in order to calculate the power losses in the electrical system of the wind power plant (known also as the "Balance of Plant"- or shortly BoP).

The WPP is simulated using simulation tools in order to determine—among other—the power losses in the system as a function of the active power level, reactive power level, voltage level.

That means that one can replicate, with a certain accuracy level, the losses in the real wind power plant, by feeding as input to the "Balance of Plant Estimator" block 301 the right information (Active Power, Reactive Power, Voltage Level).

Knowing the power losses (i.e. Balance of Plant) in a system one can use this information to improve the active power controller response.

The embodiments shown in the following, suggest to use the "Balance of Plant Estimator" (i.e. the system that calculates losses in the wind power plant) in tandem with a "regulator" which in an embodiment is a Low Pass Filter (LPF) to improve the active power controller response.

Stability of the aforementioned control loop is given mainly by the relatively high sample time (and to some extent by the communication delays in the feedback).

The "Total WTG Power Signal Conditioning" block 302 is contributing as well to the stability, by means of the actions described above. However, this cannot be considered as closed loop stability, given its non-linear characteristic.

The reason for not considering the action of the "Total WTG Power Signal Conditioning" block as providing closed loop stability is because its behaviour is non-linear, in the sense that there is no compensator that contributes to stability in a continuous manner. Oscillations in the reference power sent to the WTGs are reduced by some sort of "filtering". However, this filtering is active only when certain conditions are met.

If the sampling time is relatively high (e.g. 1 s) the control loop is stable even without the action of the "Total WTG Power Signal Conditioning" block.

However, if the sampling time is reduced (e.g. 50 ms), this is not the case anymore and the only stability in the loop would be given by the "Total WTG Power Signal Conditioning" block, as it was already mentioned, it cannot be considered as closed loop stability—but rather an artificial way of reducing/eliminating oscillations in the reference power sent to the WTGs.

An advantage of the embodiments which uses BoP loss estimation is that system decreases the response time. The response time requirements in some countries ask for reaction time of less than 200 ms, and therefore can a feed-forward of the losses improve the system response.

As mentioned above, there is a need for faster reaction time in order to satisfy the grid code requirements. Therefore, the sampling time is significantly reduced and the communication delays in the forward path as well as in the measurement path are reduced as well.

These modifications would lead to instability of the control loop for a structure as the one presented above in FIG. 3.

The regulator can in general be included in:
The forward path
The feedback path (i.e. WTG power production, POI power production, both WTG and POI power production, the difference between WTG and POI power production)
Both the forward and feedback path
The regulator can perform the following functions:
It provides closed-loop stability to the system
It provides a smoothing action to the signal on which it is used
It has the possibility to initialize its output to a convenient value at convenient times, in order to improve the transient response quality of the controller.
The regulator can have the following inputs:
The signal to be regulated/filtered
The signal used to initialize the regulator (initialization value)
The reset signal used to trigger initialization of the regulator The output of the regulator is a regulated/filtered signal that can be used to generate correct/convenient power references to the WTGs according to the desired output at POI.

Figure 4:
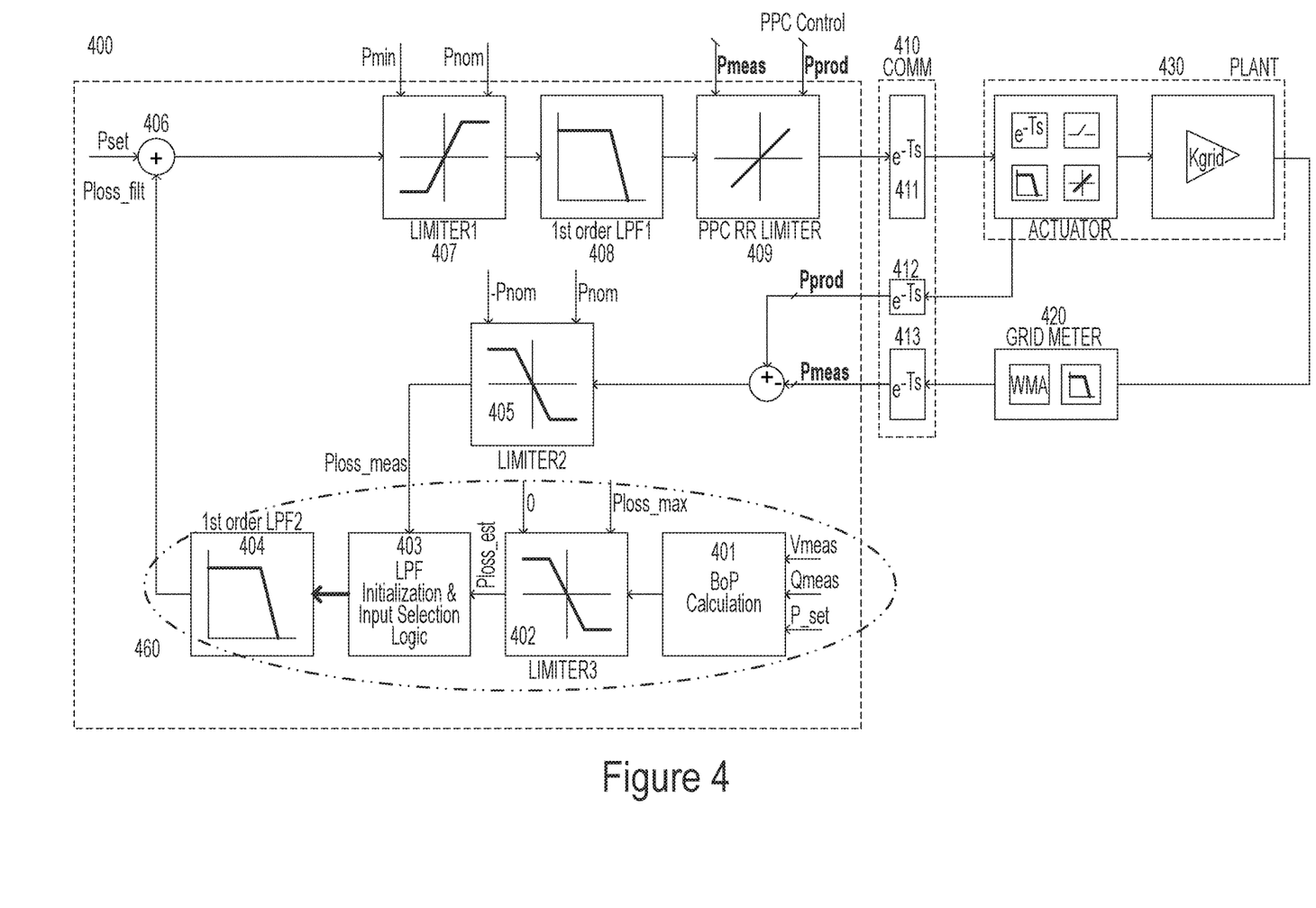
FIG. 4 shows a schematic diagram of the active power loop for an embodiment with a Proportional controller with filtering of measured power losses.

Regulator initialization can be obtained by means of a system that uses a set of information/inputs available in the controller in order to generate the aforementioned inputs for the regulator. The initialization system 403 can decide which input is provided to the regulator (e.g. the measured power losses, the estimated power losses, the power error/change, the estimated power error/change, etc.), when this input is changed, what is the value to which the input is initialized, etc.

The information/inputs used by the initialization function 403 can be as follows:
- The measured power losses in the system
- The estimated power losses in the system
- The power set-point to the P controller
- The power error/change (i.e. the difference between the power set-point and the measured power at POI in one sample; the difference between the power set-point at the current time and the power set-point at the previous sample time)
- Function settings (e.g. threshold values)

Power loss estimation can be obtained by means of a system that uses a set of information/inputs available in the controller in order to generate an approximation of the losses in the system for specific operating points (voltage, active and reactive power levels, temperature, current, etc.). The estimated power losses can be used to initialize the output of the regulator in such a way that a correct/convenient power set-point is provided to the WTGs, according to the desired output at POI during steady state or transient operation.

The following information/inputs can be requested by the power loss estimation function:
- The measured voltage at POI
- The measured reactive power at POI
- The power level of the WPP for which the power losses need to be estimated
- The measured temperature of the power cables
- The measured current at the POI The power loss estimation function can be built in several ways (using real system measurements, simulation results, or other calculation means), for example:
- Using multi-dimensional lookup tables which output a certain power loss level based on specific voltage, reactive power and power set-point levels
- Using transfer functions (power loss curves)—one function for each voltage, reactive power and power set-point levels The benefits of the embodiment can be listed as:

1) It improves the transient performance of the active power loop for a wind power plant (e.g. improves controller speed during power set-point changes but also during different types of disturbances).

2) It provides a smoothing action to the signal on which it is used in this way facilitating disturbance rejection capabilities to certain controller applications.

3) It ensures continuous closed-loop stability to the system under steady-state operation.

4) It provides better performance during continuous power set-point changes (e.g. primary frequency control).

As it is shown in the power reference equation, the reference power sent to the WTGs (Pref_WTG) is the sum between the power set-point (Pset) and the measured power losses (Plosses).

Due to different communication delays between the measured WTGs power production and the measured power at POI, the measured power losses are not having the correct (real) value, which leads to incorrect reference power sent to the WTGs (Pref WTG).

A large sampling time allows sufficient time for the measured losses to reach a reasonable value, so that the oscillations in the power reference are relatively small. However, if the sampling time is small enough (e.g. smaller than the difference between the communication delays of $P_{meas}$ and $P_{prod\_WTG}$), the oscillations in the WTGs power reference are high. This stability problem was described above. It was explained that this solution is not ideal since is not providing a continuous closed loop stability. In order to solve the problem, the following solution can be applied.

The Power loop is arranged with access to the measured power losses in the system (the WTGs reference power is formed by the power set-point plus the system's filtered measured losses), the data is communicated and discretized in block 412 and 413. In this way the LPF 404 can be added in the closed loop increasing its stability.

The LPF 404 performs two main actions:
- It provides closed-loop stability to the system in steady-state operation.
- It has the possibility to be initialized with a specific value during set-point change transients. Therefore, the filter can be initialized with the corresponding power losses at that specific power set-point, in this way maximizing the controller's speed.
- It provides a smoothing action to the measured power losses (P 1 during output disturbance transients. In this way it provides the system with disturbance rejection capability.

Figure 5:
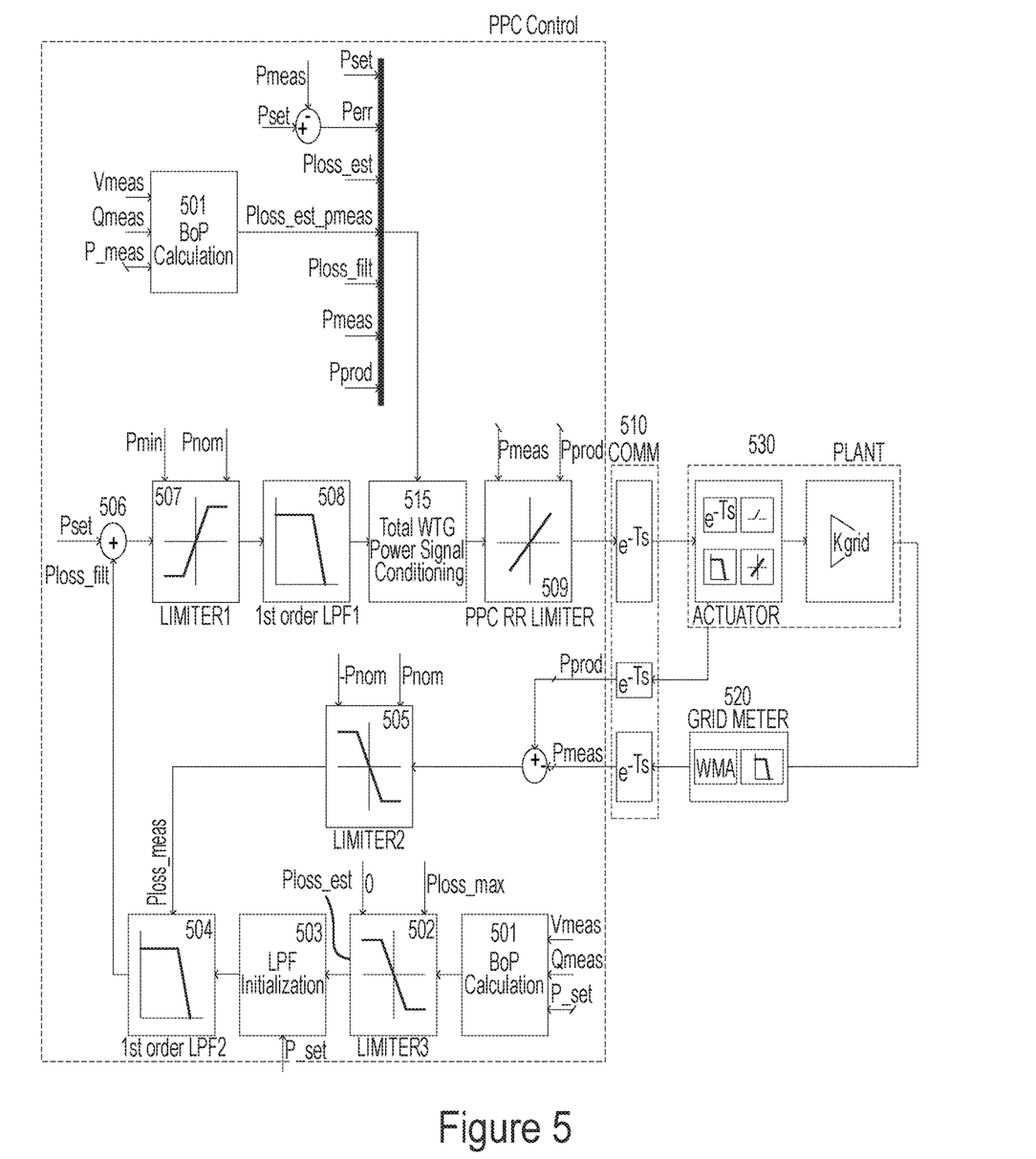
FIG. 5 shows a schematic diagram of the active power loop for an embodiment with proportional controller with filtering of measured power losses—and power signal conditioning in a forward path.

FIG. 4 shows a diagram of the active power loop for an embodiment which is a variation of a Proportional Controller with filtering of measured power losses, FIG. 5 shows a diagram of the active power loop for a second embodiment which is a variation of a Proportional Controller with filtering of measured power losses—and power signal conditioning in a forward path.

With regard to FIG. 4, the "LPF Initialization & Input Selection Logic Block" 403 is responsible for deciding which signal should be used as input to the "1st order LPF2" block 404, namely the estimated power losses or the measured power losses.

The logic used for switching between the two signals is as follows:

The estimated power losses and the measured power losses are compared to each other. If the difference between them is bigger than a user defined value, it means there is a transient situation in the system. For the reasons stated a few lines above (i.e. during certain type of transients), it means the system should choose as input to the "1st order LPF2" block 404 the estimated system losses.

The comparison is done in the form of a logic function, which can output two values, namely 0 (when the difference between them is bigger than a user-defined value) or 1 (when the difference between them is smaller than a user defined value). The output of this logic function is used as input to the "set" pin of a "Set/Reset" function.

The power set-point is evaluated to check if there are power set-point changes. This is done by comparing its "present" value with the value at the previous state. The comparison is done in the form of a logic function which can output two values, namely 0 (when the two values are not equal) or 1 (when the two values are equal). This output is used in several ways:

a) as "reset" input to the aforementioned "Set/Reset" function, emphasizing a power set-point change.

b) as initialization of the "1st order LPF2" block 404, by taking a sample of the estimated power losses during the power set-point change.

c) as reset signal for the "1st order LPF2" block 404 during a power set-point change.

The aforementioned "Set/Reset" function takes as inputs the signals mentioned above.

When a transient situation is detected, the "Set" input is triggered and the output of the block will be set to 1 (i.e. the estimated losses in the system will be used as input to the "1st order LPF2" block).

When there is no change in the power set-point, the "Reset" input is triggered and the output of the block will be set to 0 (i.e. i.e. the measured losses in the system will be used as input to the "1st order LPF2" block). This ensures that the input to the "1st order LPF2" block 404 during output disturbances is the measured power losses signal.

The "BOP Calculation" block 401 is responsible for estimating the power losses in the system corresponding to a certain power set-point. This block can be a lookup table or it can be a set of transfer functions which take as inputs the voltage and reactive power as well as the power set-point.

In order to add continuous closed loop stability to the controller and improve overall controller performance, an embodiment as shown in FIG. 4 is used.

The embodiment of FIG. 4 is one example of how the "Balance of Plant Estimator" (i.e. power loss estimator) can be used in tandem with a "regulator" (e.g. the LPF) to improve the active power loop performance.

In FIG. 4 the LPF 404 is initialized to the calculated losses 401 (i.e. calculated by the Balance of Plant Estimator), this is done in block 403. This is preferred since the actual measured losses are not correct during transients—due to physical limitations of the measurement circuit. In other words, if the actual measured losses are used in the controller during transients, the power set-point will be incorrectly calculated. The output of block 401 is limited in block 402, the limit in set by Ploss_max variable.

The output of the LPF filter 404 is added 406 to the power setpoint (as shown in the equations above). The power setpoint is then limited by another limiter 407 and a further regulator 408 controls the power loop, before sending the set points to the WTGs there is a ramp rate limiter 409, which ensures that change in set point to the WTGs are limited. The signals in and out of the PPC are communicated via a communication block 410, with a set of discrete blocks 411, 412, 413. A grid meter 420 measures electrical parameters at a point of interest, which could be the point of common coupling. The WTGs and additional component, i.e. the plant are represented in block 430.

The controller in FIG. 4 performs better than the one shown in FIG. 3. Moreover, the controller provides continuous closed-loop stability in steady state operation.

The embodiment of FIG. 4 uses a system that comprises a regulator 404, e.g. low pass filter (LPF) or a different controller structure that performs the same functionality, which can be initialized (i.e. forced to output a convenient value at convenient times) based on information/signals available in the controller (e.g. measurements, algorithms, etc.) in order to contribute to the overall controller response quality and controller closed loop stability. The encircled area 460 in FIG. 4 shows the Power loss system with filter 404.

This control structure of the embodiment of FIG. 4 provides the following benefits:

1) It provides continuous closed-loop stability to the system under steady-state operating conditions, by the action of the "1st order LPF2" block 404.

2) It provides an estimate of the system losses during power set-point changes, in this way minimizing the controller's speed (i.e. better transient operation).

3) It provides a smoothing action to the measured power losses ($P_{meas}$) during output disturbance transients. In this way it provides the system with disturbance rejection capability.

4) It provides better performance during continuous power set-point changes (e.g. primary frequency control), because the reference power sent to the WTGs is more accurate by using the estimated losses rather than the measured losses (i.e. because the measured losses are inaccurate due to communication delays).

In a second embodiment the proportional controller also includes filtering of measured power losses, and power signal conditioning in a forward path.

In this embodiment, the LPF is used as described for the previous embodiment, however the functionality of the "LPF Initialization" block 503 has been simplified, compared to block 403 of FIG. 4. The purpose of block 503 is to initialize the filter with an initializing value each time the power set-point is changed.

In transient operation, the "Total WTG Power Signal Conditioning" 515 together with the "LPF Initialization" block 503 ensures a correct operation of the system. In steady state operation, the "Total WTG Power Signal Conditioning" 515 is by passed and the control stability of the system is ensured by the action of the LPF block 508.

One very important advantage of the scheme presented in FIG. 5 is that the "Total WTG Power Signal Conditioning" block 515 ensures the system not to get into situations where power is lost due to wrong estimation of the power losses. In other words, no matter how bad the "BoP Calculation" block 501 estimates the losses in the system, the power error will converge to zero very fast and the "Total WTG Power Signal Conditioning" block 515 will be bypassed.

The third embodiment is an improved version of the second embodiment, and is the preferred embodiment.

Figure 6:
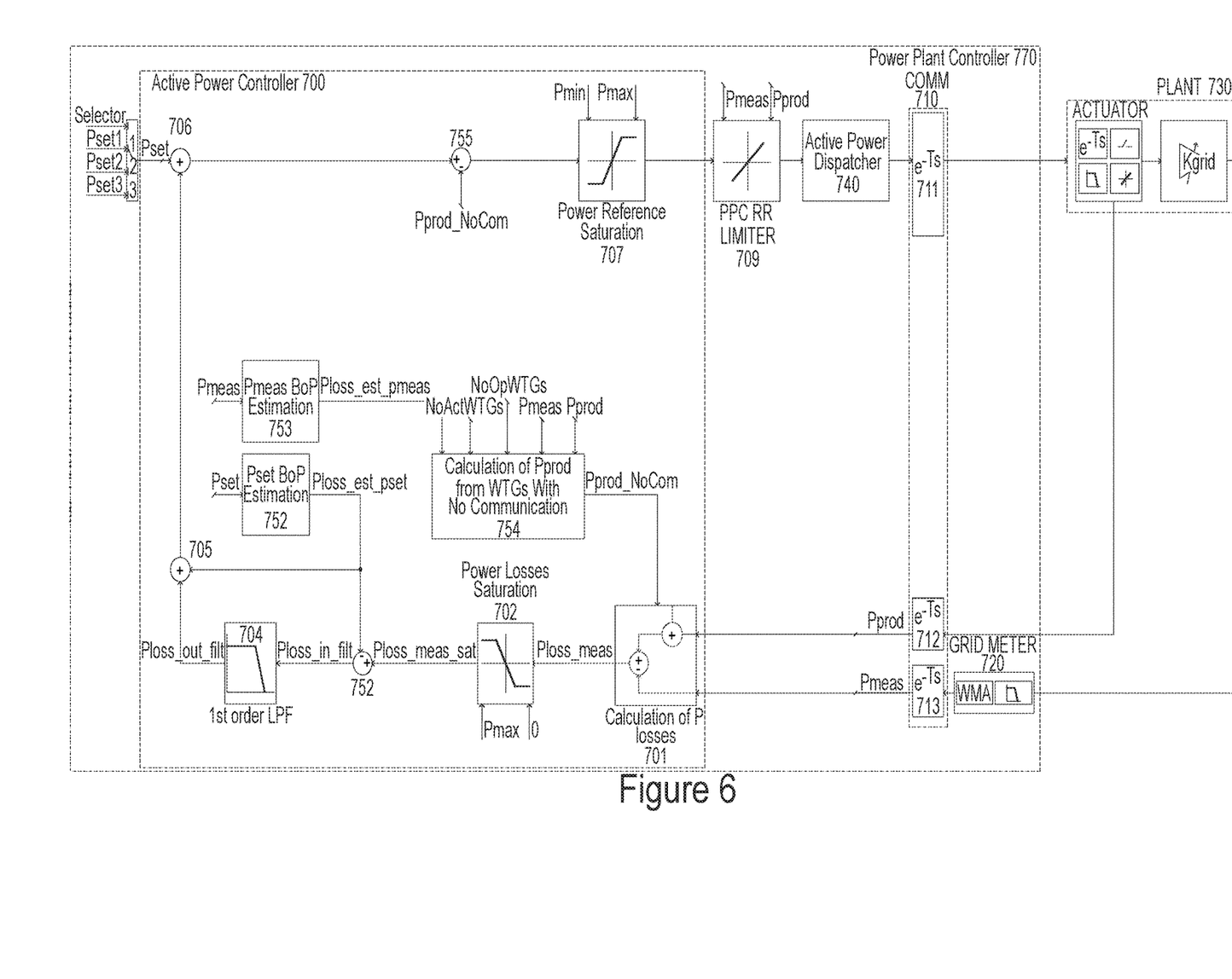
FIG. 6 shows a schematic diagram of the active power loop for an embodiment.

The idea of this embodiment is based on the same principle of using the BoP Estimator in tandem with a regulator, as explained for FIG. 4, with the remark that in this embodiment the regulator 704 does not need to be initialized anymore. Instead of initializing the regulator, the BoP is combined with the regulator in a special manner, and the result is similar and better than by doing initialization.

The main benefit of this embodiment is that it simplifies a lot the Active Power Controller's 700 structure, by allowing removal of the regulator's initialization logic as well as the "Total WTG Power Signal Conditioning" block 515.

As can be seen in FIG. 6, the main idea is to use the "BoP Estimation" block 701 at all times, instead of using it only at discrete times, in the previous embodiments the BoP loss calculation is used in discrete times (i.e. when certain conditions are met—such as power set-point change—the value calculated by "BoP Estimation" is used by the LPF 404, 504 to initialize the LPF value). So initialization only happens in a single sample when the condition is met.

The estimated BoP losses 751 are subtracted 752 from the measured losses 701, which passed through a saturation block 702 before subtraction in block 752, and the result is filtered using a low pass filter regulator 704. In the same time, the estimated BoP losses 751 are summed 705 with the output of the low pass filter regulator.

The result is that the low pass filter regulator 704 will have to act only on the difference between the measure losses and estimated losses. If the BoP estimation is accurate, it means the low pass filter action is minimized.

The regulator 704 can as in the previous embodiments, be any kind of regulator that can provide the filtering function.

With regard to FIG. 6, the APC 700 consists of five (5) main blocks:

1st order LPF 704,
Calculation of P_losses 701,
Calculation of P_prod from WTGs with No Communication 754, (optional)
BoP Estimation1 751, and
BoP Estimation2 753 (optional).

Besides these main blocks, the APC contains two saturation blocks 702, 707 which are used for protective reason (i.e. Power Losses Saturation and Power Reference Saturation).

The 1st order LPF block 704 provides a filtering function of the signal and has the role to ensure stability of the control loop. As can be noticed in the diagram, the filter only acts on the difference between the measured active power losses and the estimated active power losses 752. In this way the controller speed can increase, given the estimated losses 751 are accurate (e.g. for very accurate active power loss estimation, the filter is effective only during transients).

The Calculation of P losses block 701 is responsible for measuring the active power losses in the system (between the WTG active power production measurement and PCC active power production measurement).

The P Losses block 701 is responsible for calculating the losses in the system as the difference between the measured power at the PCC and the total power production of the WTGs. Active power production from WTGs that have lost communication is taken into account in order to allow fall-back strategies. During a step response of the APC, the total power production of the WPP signal (i.e. Pprod) is delayed compared to the measured power at the PCC signal (i.e. Pmeas). Therefore, the calculated power losses are negative during the transient and will converge to the real losses in the system as the steady state operation is reached.

Figure 7:
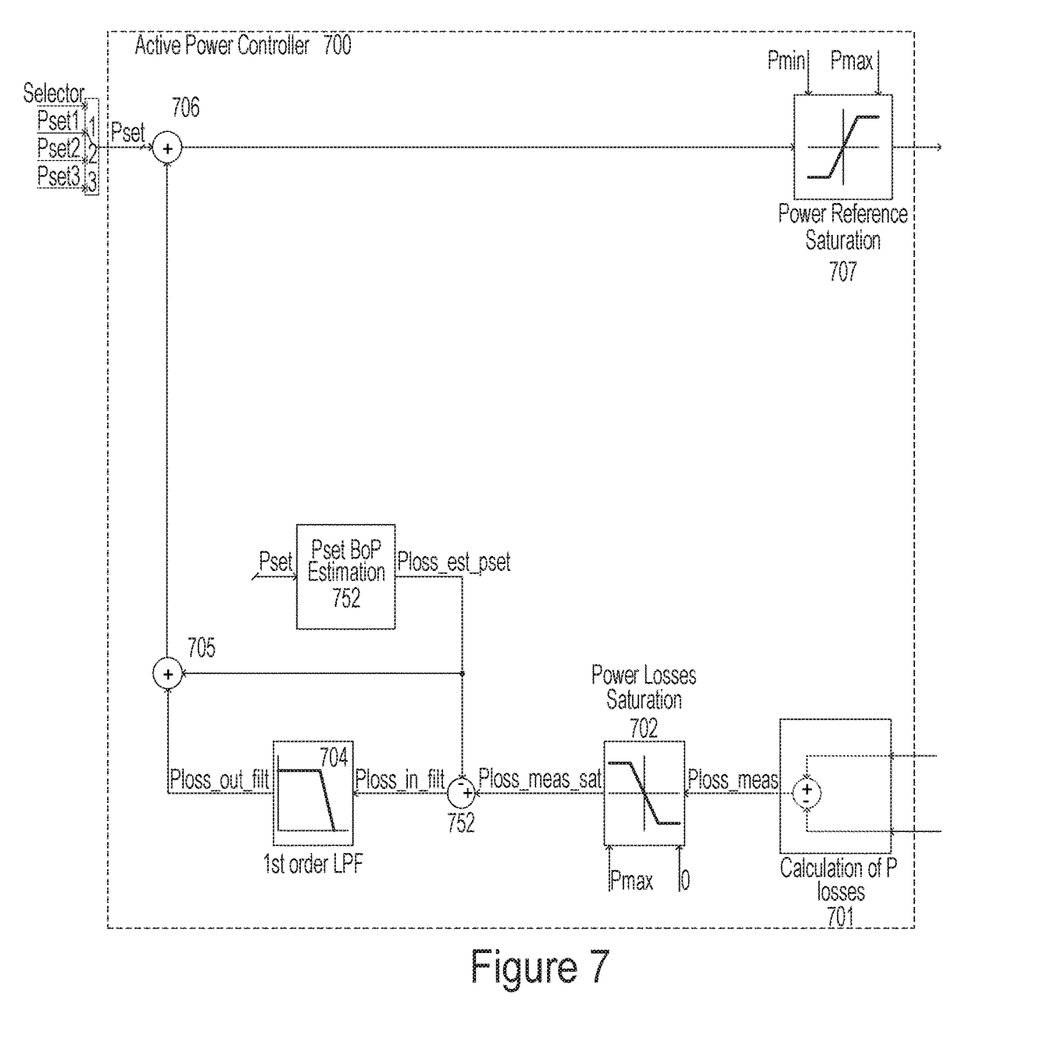
FIG. 7 shows a schematic diagram of the active power loop for an embodiment, without loss of communication with the WTGs features.

FIG. 7 shows a diagram of the active power loop for an embodiment, without loss of communication features.

Figure 8:
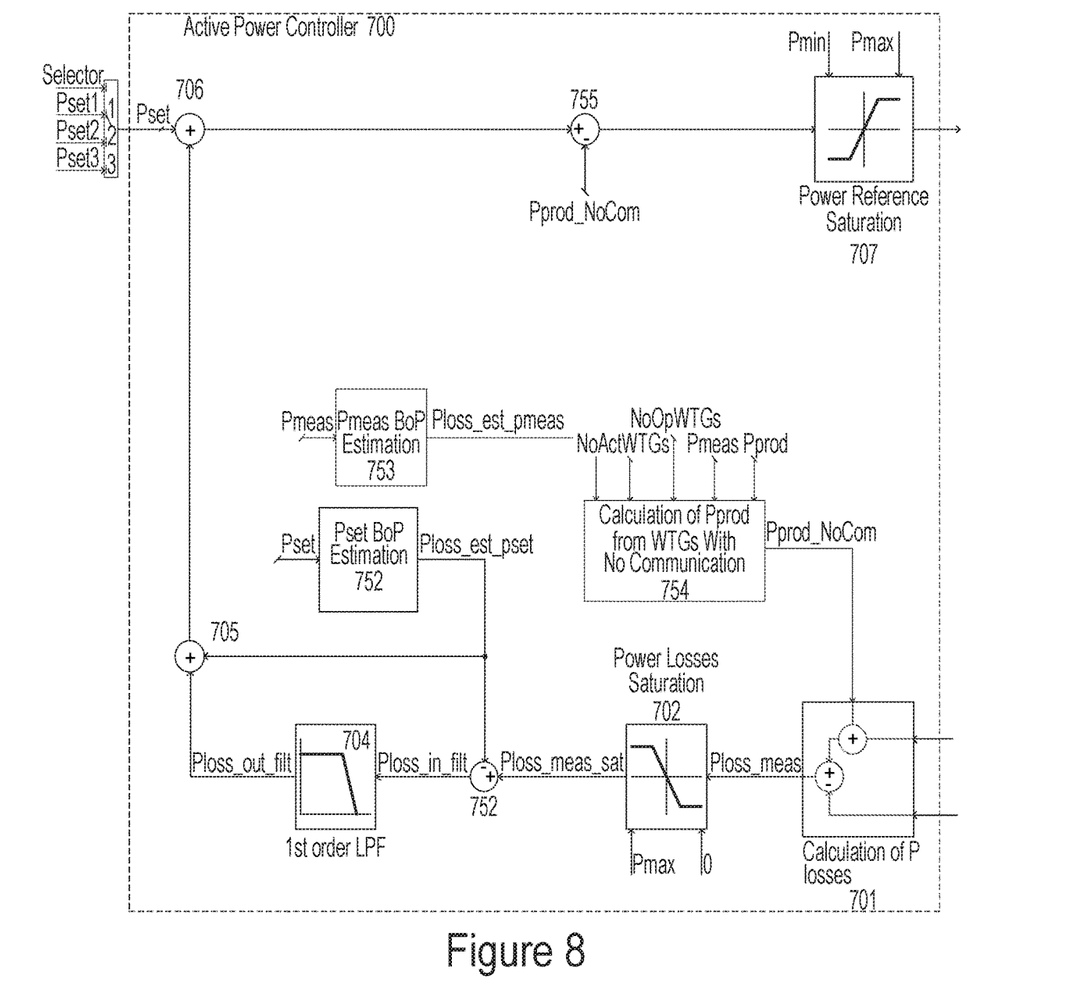
FIG. 8 shows a schematic diagram of the active power loop for an embodiment, with loss of communication features.

In an embodiment the active power production from WTGs that have lost communication with the PPC is taken into account when calculating the losses.

FIG. 8 shows a diagram of the active power loop for an embodiment, with loss of communication features.

The Calculation of Pprod from WTGs with No communication block 754 is responsible for calculating the active power production from WTGs that have lost communication with the PPC.

These WTGs even though they do not report any power production feedback to the PPC, they might still be producing power which is measured at the PCC. This power must be considered when generating the WPP active power reference.

In an embodiment the active power production from WTGs that have lost communication with the PPC is subtracted in a feed forward loop, thereby compensating the active power controller. The subtraction is because the WTGs that have no communication will not be able to receive set-points, so the reference to be dispatched should be less with the amount that cannot be sent to the WTGs (i.e. basically the measured production from these WTGs with no communication to PPC)

The BoP Estimation1 751 and BoP Estimation2 753 blocks are responsible for estimating the losses of the WPP collection grid, but also the losses inside the WTGs. By saying losses inside the WTGs it is meant the losses which occur after the power measurement in the WTG, often the losses in the trafo, switch gear and cables on the medium voltage side of the trafo.

One of the blocks 751 is estimating the losses based on the power reference set-point and is used for increasing the controller's speed. The other 753 is estimating the losses based on the power measurement at the PCC and is used for estimating the power production from WTGs that have lost communication with the PPC.

The Perror Calculation block calculates the controller's power error signal, as the difference between the controller's power setpoint and the measured power at the point of interconnection. This is to be used by other controllers inside the PPC.

The Power Losses Saturation 702 and Power Reference Saturation 707 blocks have the role to protect the controller from experiencing unreasonable signal values, e.g. active power losses limited between zero and a maximum value.

The Power Losses Saturation block 702 as a protective saturation function applied to the signal entering the $1^{st}$ order LPF block 704. The lower limit of this saturation function must be set to zero (0) and the upper limit must be set to the maximum active power losses that can occur in the WPP (between the WTG active power production measurement and PCC active power production measurement).

The $1^{st}$ order LPF filtering function block 704 has the main role to bring stability to the control loop. As it was explained previously, the filter only acts on the difference between the measured active power losses and the estimated active power losses. In this way the controller speed can increase, given the loss estimation is accurate.

Embodiments of the invention are not limited to use a $1^{st}$ order LPF filter, but many other regulators can be used in the loop.

The Power Reference Saturation block 707 acts as a protective saturation function applied to the output signal of the Active Power Controller block 700. The lower limit of this saturation function must be set to the minimum active power value and the upper limit must be set to the maximum allowable power that can be produced by the WPP (including in over-boost condition).

The BoP Loss Estimation function is based on second order functions which take as argument the active power level for which the collection grid losses and WTG losses must be estimated. This second order function can be obtained by means of electrical predesign studies.

The BoP Loss Estimation block is built such that a plurality of power loss curves can be implemented for different conditions of voltage level and reactive power level. In this way the controller can choose one of the curves, based on the actual conditions in the collection grid.

In an embodiment the power loss curves are predefined by simulations.

In another embodiment the power loss curves are generated in a routine based learning algorithm, thereby learning the APC 700 adaptively the data of the plant.

The Calculation of Pprod from WTGs with No Communication block 754 is responsible for calculating the active power production from WTGs that have lost communication with the PPC. The calculation is based on the active power measurement at the PCC, the reported active power production from WTGs and the estimated active power losses based on the active power measurement at the PCC. The calculation returns a value bigger than zero (0) only when the communication loss is detected.

For the Power Losses Saturation block 702 the limits must be set between zero (0) and the maximum losses level that can occur in the WPP (between the WTGs active power production measurement and PCC active power production measurement).

For the Power Reference Saturation block 707 the limits must be set between zero (0) and the maximum allowable power that can be produced by the WPP (including in over-boost condition).

Any range or device value given herein may be extended or altered without losing the effect sought, as will be apparent to the skilled person.

While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the scope of the invention as defined by the appended claims. Any range or device value given herein may be extended or altered without losing the effect sought, as will be apparent to the skilled person.

Embodiments of invention can be implemented by means of electronic hardware, software, firmware or any combination of these. Software implemented embodiments or features thereof may be arranged to run on one or more data processors and/or digital signal processors. Software is understood as a computer program or computer program product which may be stored/distributed on a suitable computer-readable medium, such as an optical storage medium or a solid-state medium supplied together with or as part of other hardware, but may also be distributed in other forms, such as via the Internet or other wired or wireless telecommunication systems. Accordingly, the computer-readable medium may be a non-transitory medium. Accordingly, the computer program comprises software code portions for performing the steps according to embodiments of the invention when the computer program product is run/executed by a computer or by a distributed computer system.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind power plant comprising a plurality of wind turbine generators, the method comprising:
   deriving, by a hardware processor of a power plant controller of the wind power plant, a first estimated value for electrical losses in the wind power plant;
   estimating, by the hardware processor, a second estimated value for electrical losses based on a measured aggregated power of one or more wind turbine generators of the plurality of wind turbine generators that have lost communication with the power plant controller;
   deriving, by the hardware processor, a measured value for electrical losses in the wind power plant based on (A) a difference between (i) a sum of active power production from the plurality of wind turbine generators and (ii) a measured power at a point of common coupling and (B) the second estimated value for electrical losses;
   inputting a difference between the first estimated value for electrical losses and the measured value for electrical losses into a regulator of the power plant controller; and
   using a sum of a power set point, the first estimated value for electrical losses, and an output of the regulator as a power reference for the wind power plant.

2. The method according to claim 1, further comprising generating, by the hardware processor, an input signal for the regulator when a power set-point is changed.

3. The method according to claim 1, wherein deriving the first estimated value for electrical losses is based on a power set point and a first look up table.

4. The method according to claim 1, wherein the first estimated value for electrical losses is derived based on an estimated power output of the plurality of wind turbine generators combined with a set of look up table values.

5. The method according to claim 4, wherein the set of look up table values is derived using routine based learning while operating the wind power plant.

6. The method according to claim 1, wherein the regulator is a low pass filter.

7. The method according to claim 1, further comprising subtracting a power production value of the one or more wind turbine generators that have lost communication with the power plant controller.

8. An active power controller for controlling a wind power plant, the wind power plant comprising a plurality of wind turbine generators, the active power controller comprising:
   a module for:
      deriving a first estimated value for electrical losses in the wind power plant; and
      estimating a second estimated value for electrical losses based on a measured aggregated power of one or more wind turbine generators of the plurality of wind turbine generators that have lost communication with the active power controller;
   a module for deriving a measured value for electrical losses in the wind power plant based on (A) a difference between (i) a sum of active power production from the plurality of wind turbine generators and (ii) a measured power at a point of common coupling and (B) the second estimated value for electrical losses; and
   a regulator arranged to receive a difference between the first estimated value for electrical losses and the measured value for electrical losses, wherein a sum of a power set point, the first estimated value for electrical losses, and an output of the regulator is used as a power reference for the wind power plant.

9. A computer program product loadable into an internal memory of a processing device, the computer program product comprising software code portions for performing an operation for controlling a wind power plant comprising a plurality of wind turbine generators, the operation comprising:
   deriving a first estimated value for electrical losses in the wind power plant;
   estimating a second estimated value for electrical losses based on a measured aggregated power of one or more wind turbine generators of the plurality of wind turbine generators that have lost communication with the processing device;

deriving a measured value for electrical losses in the wind power plant based on (A) a difference between (i) a sum of active power production from the plurality of wind turbine generators and (ii) a measured power at a point of common coupling and (B) the second estimated value for electrical losses;

inputting a difference between the first estimated value for electrical losses and the measured value for electrical losses into a regulator; and using a sum of a power set point, the first estimated value for electrical losses, and an output of the regulator as a power reference for the wind power plant.

* * * * *